United States Patent [19]

Johnson

[11] Patent Number: 4,790,208

[45] Date of Patent: Dec. 13, 1988

[54] KNOB AND SHAFT ASSEMBLY

[75] Inventor: Duane R. Johnson, Wellington, Ohio

[73] Assignee: Allied-Signal Inc., Morristown, N.J.

[21] Appl. No.: 164,290

[22] Filed: Mar. 4, 1988

[51] Int. Cl.$^4$ .................................................. F16D 1/06

[52] U.S. Cl. .......................................... 74/548; 16/121; 403/307; 403/299; 411/189

[58] Field of Search .................. 74/548; 403/319, 307, 403/299; 411/187, 188, 189, 229, 908; 16/121

[56] References Cited

U.S. PATENT DOCUMENTS

| | | | |
|---|---|---|---|
| 382,920 | 5/1888 | Westinghouse, Jr. | 411/189 |
| 844,750 | 2/1907 | Rieschick | 411/188 |
| 2,007,555 | 7/1935 | Wiltshire, Jr. | 16/121 |
| 2,137,668 | 11/1938 | Fisher | 16/121 X |
| 2,517,476 | 8/1950 | Frost | 411/189 |
| 3,543,605 | 12/1970 | Sherman | 74/548 |
| 4,000,539 | 1/1977 | Neyer | 16/121 |
| 4,289,181 | 9/1981 | Capuano | 411/187 |

*Primary Examiner*—Peter A. Aschenbrenner
*Attorney, Agent, or Firm*—Ken C. Decker; William N. Antonis

[57] ABSTRACT

A knob and shaft assembly for operating, for example, a vehicle air brake control valve includes a knob member having a front face and a barrel projecting the face, and a shaft member which is threadedly engaged with the threads carried on the circumferentially extending wall defining cavity within the barrel. The assembly is provided with locking detents comprising protrusions on the shaft which are received within apertures on the barrel to releasably lock the knob member to the shaft member, thereby preventing the members from being accidentally becoming disengaged, and also assuring the proper orientation of the knob with respect to the shaft to permit indicia embossed on the knob member to be easily read by the operator.

4 Claims, 1 Drawing Sheet

KNOB AND SHAFT ASSEMBLY'

This invention relates to a knob and shaft assembly for applications in which the assembly is subjected to high impact loads and for applications in which the knob and shaft must be indexed relative to one another in a predetermined angular orientation.

Many controls require that a knob be mounted on a shaft. Some of these controls, such as those used t control the parking brakes of a heavy duty vehicle, subject the shaft and knob to high impact loads because they automatically "pop" when system pressure drops below a predetermined level. For these applications it is desirable that the knob be properly indexed angularly relative to the shaft, since legends are incorporated onto the knob which must be read by the vehicle operator. Accordingly, the knob must be fixed to the shaft so it can withstand the high impact loads and should also be oriented so that the legend on the knob can be easily read by the vehicle operator. Some applications also require that the knob be easily dismountable from the shaft, since some apparatus controlled by such knob and shaft assemblies require that the knob be removed from the shaft before the assembly can be removed from the vehicle or other machine on which it is used for servicing.

Heretofore, knobs have been fastened to shaft assemblies by roll pins. However, use of such roll pins pose manufacturing difficulties, and the knobs cannot be easily removed from the shaft. Pinning requires that the position of the roll pin hole be accurately located in both the knob and the shaft, that the knob be accurately oriented in relationship to the shaft, and that the roll pin be firmly pressed into place. Obviously, such a procedure was difficult to implement economically in the manufacture of such assemblies. Furthermore, the holes for the roll pins reduce the strength of the shaft and knob.

These and other advantages of the present invention will become apparent from the following description, with reference to the accompanying drawings, in which.

Figure 1:
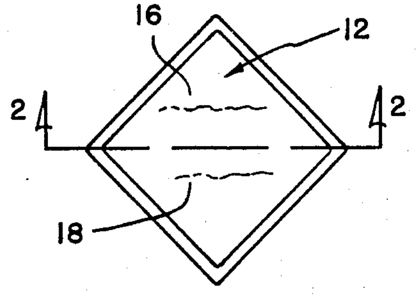
FIG. 1 is a plan view of the outside of the knob member used in the assembly pursuant to the present invention.
Figure 2:
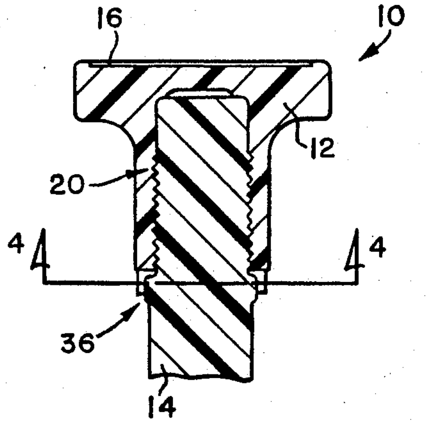
FIG. 2 is a cross-sectional view taken substantially along lines 2—2 of FIG. 1.
Figure 3:
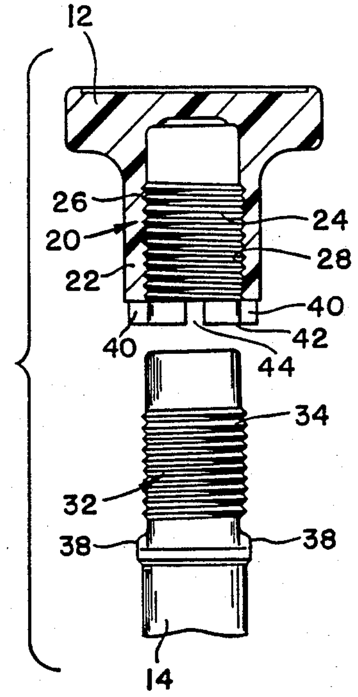
FIG. 3 is a view similar to FIG. 2 but illustrating the knob member and shaft member of the present invention in exploded relationship to one another.

Referring now to the drawings, a knob and shaft assembly generally indicated by the numeral 10 includes a knob member 12 and a shaft member 14. As most clearly indicated in FIG. 1, the knob member 12 includes a forward or front face 16 which carries indicia 18 which must be visible to the vehicle operator if, for example, the assembly 10 is used to control the vehicle air brake system. Although the specific design disclosed is intended for use in the parking control system of a vehicle air bake system, the invention may also be used to control other vehicle functions, and is also usable to control hydraulic, pneumatic, and/or electrical functions of other machinery.

The knob member 12 includes a barrel 20 which projects from the face of the knob member 12 opposite the front face 16. The barrel defines a circumferentially extending wall 22 which defines a substantially cylinderical cavity 24 therewithin. The cavity 24 is defined by the circumferentially extending inner wall 26 of the barrel 20. Threads 28 are provided on the wall 26 for attachment of the knob 12 to the shaft 14.

The shaft member 14 terminates in an end portion 32 which is adapted to be received within the cavity 24 and which carries threads 34 for engagement with the threads 28.

Figure 4:
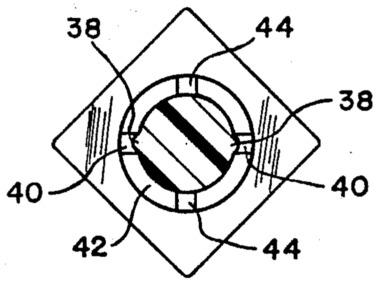
FIG. 4 is a view taken substantially along lines 4—4 of FIG. 2.

As discussed hereinabove, an important feature of the invention is the fact that a separate locking detent generally indicated by the numeral 36 locks the knob member 12 on the shaft member 14 and also assures the proper annular orientation of the knob member 12 so that the indicia 18 on the front face 16 thereof can be read by the vehicle operator when the assembly is installed on a vehicle. The detent 36 is releasable so that the knob member 12 may be unscrewed from the shaft member 14 during servicing. As best seen in FIG. 4, the detent means includes circumferentially spaced projections 38 carried on the shaft member 14 near one end of the end portion 32. The projections 38 extend radially from the outer surface of the shaft member 14. Corresponding recesses 40 are provided on the barrel 20 adjacent the open end 42 thereof and extend radially through the wall of the barrel and axially through the lower end surface 42 thereof. Additional recesses 44, which are not engaged by projections 38 are also provided. The recesses 40, 44 permit radial deflection of the portion of the wall 22 adjacent the end surface 42 to expand radially to receive the projections in the recesses. Since the plastic from which the knob member 12 is manufactured is a somewhat resilient material, the portion of the wall 22 carrying the recesses 40, 44 is deflectable to receive the projections 38, and also is deflectable to accommodate the projections 38 and to permit them to move out of the recesses 40 when the knob member 12 is unscrewed from the shaft member 14 as described hereinabove.

It will be noted that the knob member 12 and shaft member 14 can be assembled by merely screwing the knob member 12 onto the shaft member 14. As the knob member 12 is being installed on the shaft member 14, some slight additional resistance will be felt by the assembler as the end portion of the wall 22 deflects so that the projections 38 may be received in the recesses 40. The assembler may view the front face 16 of the knob member 12 to assure that the legends are properly oriented before the assembler discontinues threading two members together. When the members are to be disassembled when the valve or other device which the shaft member 14 operates is to be service, additional pressure will be initially required to force the projections 38 out of the recesses 40, but once this is accomplished, only the torque necessary to unscrew the knob member 12 from the shaft member 14 need be applied.

I claim:

1. A knob and shaft assembly comprising a knob member having a front face and a barrel defining an axis projecting from the side of the knob member opposite the said front face, said barrel including a circumferentially extending wall defining a substantially cylindrical cavity therewithin, said cavity being defined by a circumferentially extending wall surface defined by the wall of said barrel, said circumferentially extending wall surface including a threaded portion carrying threads, and a shaft member terminating in an end portion received within said cavity, said end portion defining a circumferentially extending outer surface, said outer surface including a threaded portion carrying threads threadingly engaging the threads on the wall surface of the cavity, and cooperating detent means carried by each of said surfaces on said threaded portions separate from the threads for releasably locking the knob member on the shaft member in a predetermined angular position after the threads on the wall surface of the knob member are threadingly engaged with the threads on the outer surface of the shaft member.

2. Knob and shaft assembly as claimed in claim 1, wherein said detent means includes circumferentially spaced, radially extending projections projecting from one of said surfaces and corresponding circumferentially spaced recesses in the other surface, said projections being received within said recesses when the knob member is installed on the shaft member.

3. Knob and shaft assembly as claimed in claim 2, wherein said recesses are apertures extending through the barrel and said projections project radially from the outer surface of the shaft member.

4. Knob and shaft assembly as claimed in claim 2, wherein said said barrel has a one end closed by the knob member and an opposite open end defined by a circumferentially extending end surface, said recesses extending radially through said wall of said barrel and axially through said end surface to permit radial deflection of the portion of said wall adjacent said end surface to permit said wall to expand radially to receive the projections in the recesses.

* * * * *